D. Holmes.
Hoop Skirt.

No. 585 Reissued Aug. 17, 1858.

UNITED STATES PATENT OFFICE.

DAVID HOLMES, OF WESTFIELD, MASSACHUSETTS.

IMPROVEMENT IN SKIRT-HOOPS.

Specification forming part of Letters Patent No. 20,561, dated June 15, 1858; Reissue No. 585, dated August 17, 1858.

*To all whom it may concern:*

Be it known that I, DAVID HOLMES, of Westfield, in the county of Hampden and State of Massachusetts, have invented certain new and useful Improvements in Ladies' Hooped Skirts; and I do hereby declare that the following is a full, clear, and exact description of the same, reference being had to the accompanying drawings, forming part of this specification, in which—

Figure 1:
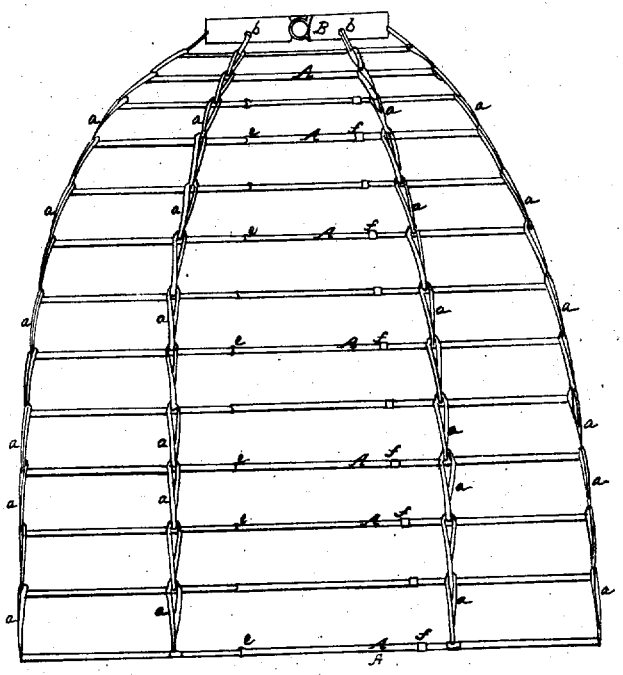
Figure 2:
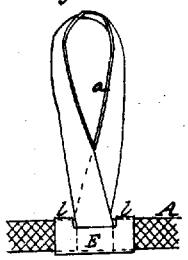
Figure 3:
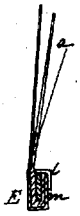
Figure 4:
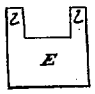
Figure 5:
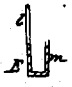
Figure 6:
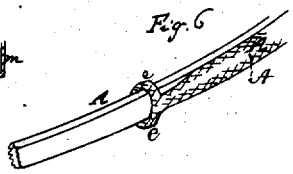

Figure 1 is a side view of a skirt with my improvements. Fig. 2 exhibits full size the manner of applying the connecting-loops to connect the hoops together as seen on the outside of the hoops. Fig. 3 is a section corresponding with Fig. 2. Fig. 4 is a face view of one of the clasps which attach the connecting-loops to the hoops, representing it in its first condition or before its application. Fig. 5 is a transverse section of the same, exhibiting the manner in which it is bent before being applied. Fig. 6 exhibits my improved method of forming the slides.

Similar letters of reference indicate corresponding parts in the several figures.

First. My invention consists in connecting the hoops together by a series of loops. The advantage of the use of loops is that in making up the skirt only one hoop need be handled at a time instead of the whole series of hoops, as in the case where the connecting or supporting tape or other article is continuous from the top to the bottom of the skirt. I describe hereinafter the arrangement of loops which I deem the best; but it is obvious that all the advantages of a series of loops may be attained no matter how the loop is secured at top or bottom, whether by sewing or otherwise.

Second. My invention also consists in attaching to the hoops the tapes, strings, ribbons, or other articles by which the hoops are suspended by means of metallic clasps which embrace the hoops. I have essayed several methods of forming the clasp and of confining the tape or other article to the hoop by means of the clasp, that which I hereinafter particularly describe being, however, the one which I deem the best. It is obvious, however, that so long as the clasp is of metal and embraces the hoop it is immaterial whether the tape or other article is fastened independently to the clasp or whether the clasp confines the tape or other article by embracing it as well as the hoop, for by either method the advantages of a metallic clasp which embraces the hoop are secured. It is also obvious that this mode of attachment may be used with any plan of suspending the hoops as well as with my plan of loops.

Third. My invention also consists in forming eyes in the braiding at the extremities of the hoops to serve as slides.

To enable others to make and use my inventions, I will proceed to describe their construction and operation in the forms which I deem the best.

A A are the hoops, supposed to be covered by braiding thread upon them, as is generally done for skirts of the best quality. *a a* are the loops which connect the hoops together, attached securely to the hoops, an equal number to every hoop, and at corresponding distances apart. These loops are made to connect the hoops together by drawing those of each hoop through those of the hoop below it, as shown in Figs. 1 and 2. The loops of the uppermost hoop also serve to attach the hoops to the waistband B, the said loops being passed through eyelet-holes *b b* in the band and secured by passing a tape or lace through them to prevent their being withdrawn from the eyelet-holes. If it be desired to use the loops without using the second part of my invention, of course the loops may be sewed to the covering of the hoops.

The form of clasp which I deem the best is shown in Figs. 4 and 5, and is shown applied in Figs. 2 and 4. The loops in Fig. 1 are supposed to be attached by similar clasps; but in that figure the clasps are concealed by the connecting-loops *a a*. The clasp E consists of a piece of thin sheet-brass or other metal of nearly square form, of a width about or nearly equal to three times that of the hoops, having a piece cut from one side of a width equal to the tape of which the loops are to be formed, and of a depth about equal to the width of the hoop, leaving two lips, *l l*, as shown in Figs. 2, 3, 4, and 5. To attach a loop, *a*, by means of this clasp, the plate E, constructed, as shown in Fig. 4, to form the clasp, has the edge opposite to the lips *l l* first bent up, as shown at *m*, Fig. 5. A piece of tape of sufficient length is then taken and doubled to bring its ends together, and its ends are applied to one side of and lapped under the hoop, as shown in red outline in Fig. 3. The clasp, in the condition shown in Fig. 5, is then applied to the lapping of the loop, with the lips *l l* one on each side of the loop. The part *m* is then pinched up close with the fingers or with pliers, and then the lips *l l* are folded over and pinched up tightly in the same manner, which finishes the attachment and brings the clasp to the condition shown in Figs. 2 and 3. The braided eyes at the extremities of the hoops are indicated by *e e* in Figs. 1 and 6. These are formed of proper size for the braided hoops to slide through them. They are produced at the commencement of the braid in a manner well understood by persons skilled in the art of braiding. The slides constituted by these eyes are much better than metal slides, as, though they permit the adjustment or variation of the sizes of the hoops, they are less likely to slide accidentally. The loops *e e* cannot be conveniently formed at both extremities of a hoop, so I use at one end a sliding metal clasp, *f*, of the usual or other construction.

What I claim as my invention, and desire to secure by Letters Patent, is—

1. Connecting the hoops to each other by a series of loops, substantially as specified.

2. Attaching to the hoops the tapes or other articles by which the hoops are suspended by means of metallic clasps which embrace the hoops, substantially as specified.

3. Forming eyes in the braiding at the extremities of the hoops to serve as slides, substantially as specified.

DAVID HOLMES.

Witnesses:

SAML. BLATCHFORD,
ALCÉE A. ATOCHA.